(12) United States Patent
Kutch

(10) Patent No.: US 9,479,592 B2
(45) Date of Patent: Oct. 25, 2016

(54) REMOTE MANAGEMENT FOR A COMPUTING DEVICE

(75) Inventor: Patrick G. Kutch, Tigard, OR (US)

(73) Assignee: INTEL CORPORATION, Santa Clara, CA (US)

(*) Notice: Subject to any disclaimer, the term of this patent is extended or adjusted under 35 U.S.C. 154(b) by 881 days.

(21) Appl. No.: 13/434,975

(22) Filed: Mar. 30, 2012

(65) Prior Publication Data

US 2013/0262642 A1    Oct. 3, 2013

(51) Int. Cl.
- G06F 15/173 (2006.01)
- H04L 29/08 (2006.01)
- H04L 29/06 (2006.01)

(52) U.S. Cl.
CPC ........... *H04L 67/125* (2013.01); *H04L 63/168* (2013.01)

(58) Field of Classification Search
CPC .................................................. H04L 67/025
USPC ............................................................. 709/223
See application file for complete search history.

(56) References Cited

U.S. PATENT DOCUMENTS

| | | | |
|---|---|---|---|
| 6,920,554 B2* | 7/2005 | Rawson, III | H04L 41/046 709/221 |
| 2007/0260896 A1* | 11/2007 | Brundridge et al. | 713/300 |
| 2010/0306763 A1* | 12/2010 | Lambert et al. | 718/1 |
| 2012/0151007 A1* | 6/2012 | Mescher et al. | 709/219 |
| 2012/0278802 A1* | 11/2012 | Nilakantan et al. | 718/1 |
| 2013/0254566 A1* | 9/2013 | Florez-Larrahondo et al. | 713/310 |

* cited by examiner

*Primary Examiner* — Glenford Madamba

(57) ABSTRACT

Examples are disclosed for remote management of a computing device. In some examples, a secure communication link may be established between a network input/output device for a computing device and a remote management application. Commands may be received from the remote management application and management functions may be implemented at the network input/output device. Implementation of the management functions may enable the remote management application to manage or control at least some operating parameters of the computing device. Other examples are described and claimed.

23 Claims, 5 Drawing Sheets

REMOTE MANAGEMENT FOR A COMPUTING DEVICE

BACKGROUND

A growing number of low-cost computing devices may be deployed as servers in Internet Portal Data Centers (IPDCs). IPDCs typically configure large numbers of low-cost servers to do massively parallel activities. In order to keep costs low for these types of servers, a kind of management controller known as a baseboard management controller (BMC) may not be included. A BMC is typically installed as a separate controller chip or device and is used to communicate with and/or carry out commands received from a remote management application.

DETAILED DESCRIPTION

As contemplated in the present disclosure, a management controller known as a BMC may not be added to computing devices deployed as low cost servers in such environments as IPDCs. The large numbers of servers deployed in these types of environments, often in remote/geographically dispersed locations, may benefit from at least some of the remote management functionality provided by a BMC. Some examples of beneficial remote management functionality may include secure remote power actions, secure remote access to basic input/output system (BIOS) configuration, watchdog timer, temperature sensors or general sensor access (e.g., intrusion detection, fans, current sensors, etc.). However, the lack of a separate management controller such as a BMC may be problematic to providing the above-mentioned remote management functionality. Some devices typically included in low cost computing devices such as network I/O devices (e.g., Ethernet controllers) may be configured to provide some remote management functionality.

In some examples, techniques are implemented at a network input/output I/O device for a computing device. For these examples, a secure communication link may be established between the network I/O device and a remote management application. One or more commands from the remote management application may then be received at the network I/O device via the secure communication link. Management functions may then be implemented at the network I/O device based on the received commands. According to some examples, the management functions may enable the remote management application to manage or control at least some operating parameters of the computing device.

Figure 1:
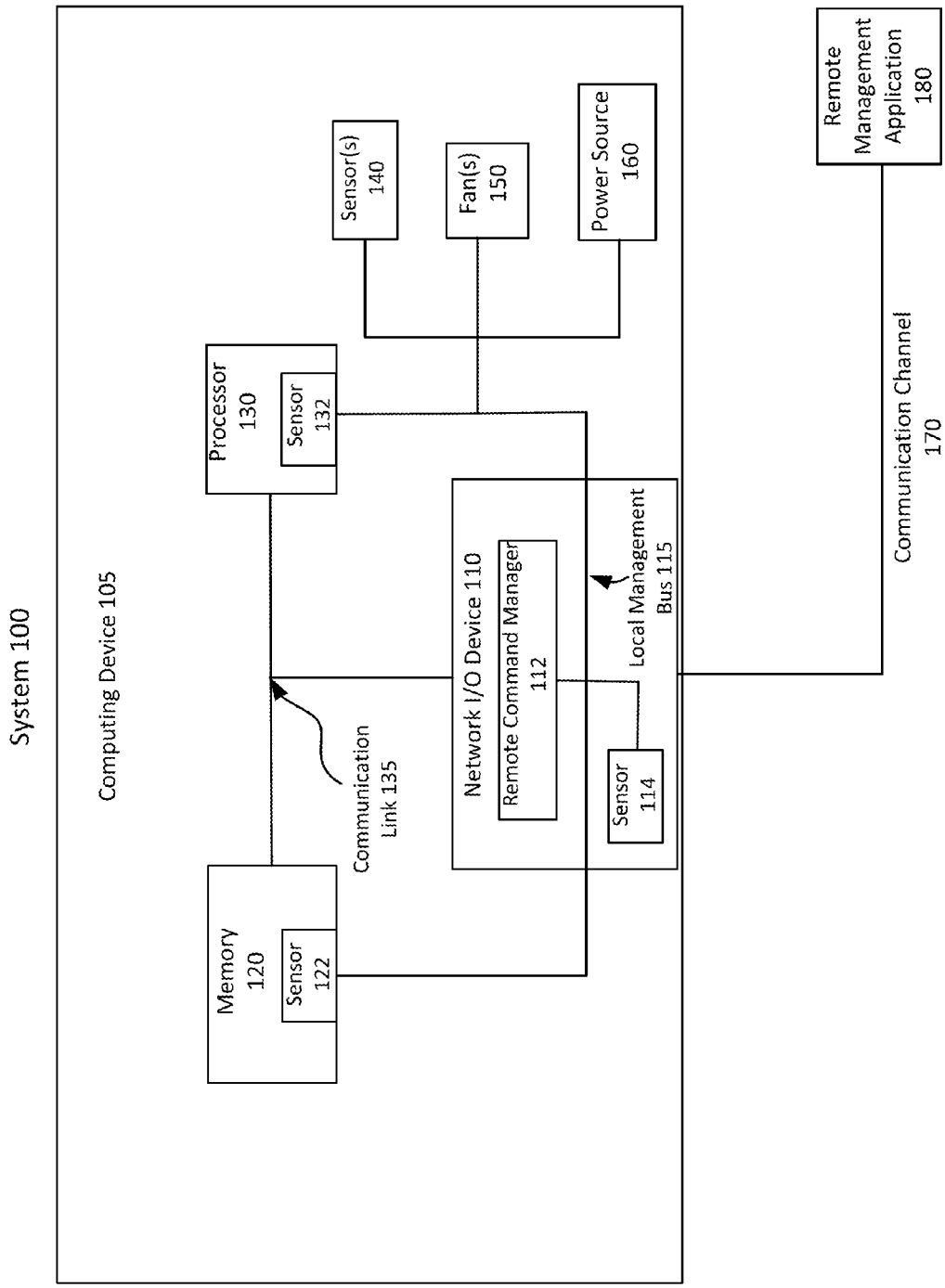
FIG. 1 illustrates a first example system.

FIG. 1 illustrates an example system 100. In some examples, FIG. 1 depicts system 100 including a computing device 105. As shown in FIG. 1, computing device 105 includes a network I/O device 110, a memory 120, a processor 130, sensor(s) 140, fan(s) 150 or a power source 160. As shown in FIG. 1, network I/O device 110 may couple to remote management application 180 via communication channel 170. Communication channel 170 may include wired and/or wireless communication mediums configured to communicatively couple network I/O device 110 and/or elements of network I/O device 110 to elements remote with respect to computing device 105 such as remote management application 180. In some examples, remote with respect to computing device 105 may include not located in a close proximity in a room, in a structure or even in a geographical location or area. Also, this disclosure is not limited to a computing device including the elements shown in FIG. 1 for computing device 105 and is not limited to a single communication channel coupled to the computing device. Other examples are described and claimed.

According to some examples, as shown in FIG. 1, network I/O device 110 may be coupled to memory 120 and processor 130 via communication link 135. Communication link 135 may be configured to allow for data received by network I/O device 140 to be processed or stored by memory 120 or processor 130. Communication link 135 may also be configured to allow for process/stored data to be gathered by network I/O device 110 and then forwarded via communication channels such as communication channel 170.

In some examples, as shown in FIG. 1, network I/O device 110 includes a remote command manager 112. Network I/O device 110 is also shown in FIG. 1 as including a local management bus 115 that may be coupled with elements at network I/O device 110 and with several elements on computing device 105. For example, sensors 114, 122 and 132 at network I/O device 110, memory 120 and processor 130 may be coupled to local management bus 115. Also, sensor(s) 140, fan(s) 150 and power source 160 may also be coupled to local management bus 115. According to some examples, remote command manager 112 may include logic and/or features configured to operate or manage local management bus 115. For these examples, based on establishment of a secure communication link with remote management application 180 over communication channel 170, remote command manager 112 may utilize local management bus 115 to enable remote management application 180 to manage or control at least some operating parameters of computing device 105.

According to some examples, the various sensors shown in FIG. 1 may include temperature sensors. For example, sensors 114, 122 and 132 may separately include temperature sensors arranged to monitor or measure temperatures at or around network I/O device 112, memory 120 or processor 130, respectively. Additionally, sensor(s) 140 may also include any number of temperature sensors or any other suitable types of sensors including, but not limited to, intrusion detection monitors, backup battery monitors, or power usage monitors. Remote command manager 112 may receive a command from remote management application 180 to implement a management function which includes obtaining operating parameter information gathered from these sensors. Remote command manager 112 may include logic and/or features to communicate with these sensors via local management bus 115 and then provide the operating parameter information via the established secure communication link with remote management application 180 over communication channel 170.

In some examples, remote command manager 112 may receive a power action command from remote management application 180. The power action command may cause remote command manager to implement a management function which includes controlling power actions for the computing device. Controlling power actions may include remote command manager 112 communicating to power source 160 via local management bus 115. Remote command manager 112 may indicate to power source 160 whether to power up, power down or reset computing device 105 based on the power action command from remote management application 180. Once remote command manager 112 has implemented the power action command, a completion message may be forwarded to remote management application 180.

According to some examples, remote command manager 112 may receive a watchdog timer command from remote management application 180. The watchdog timer command may include an indication of how often remote command manager 112 should reset a watchdog timer. For example, a watchdog timer may be reset every 5 minutes by remote command manager 112. For this example, if the watchdog timer is not reset after the 5 minutes expires, computing device 105 may be reset. Therefore, the watchdog timer may allow for computing device 105 to be reset even if remote command manger 112 becomes unresponsive to remote management application 180 and/or malfunctions. In some examples, once remote command manager 112 has implemented the watchdog timer command (e.g., set the initial watchdog timer), a completion message may be forwarded to remote management application 180.

In some examples, remote command manager 112 may receive a proxy command from remote management application 180. The proxy command may indicate to remote command manager 112 to relay information or communications via local management bus 115 to either the various sensors on or with computing device 105 or to other elements such as fan(s) 150 or power source 160. As a result of relaying the information or communications, remote command manager 112 may serve as a proxy device to allow remote management application 180 to communicate with these sensors, fans or power sources located at or with computing device 105. Once remote command manager 112 has implemented the proxy command, a completion message may be forwarded to remote management application 180.

According to some examples, network I/O device 110 may be arranged to function as a network interface card (NIC) or a local access network (LAN) on motherboard (LOM). For these examples, network I/O device 110 as well as communication channel 170 may be configured to operate in accordance with one or more applicable communication or networking standards in any version. The networking standards may include standards (including progenies and variants) such as the various Ethernet standards promulgated by the Institute of Electrical and Electronics Engineers (IEEE). The Ethernet standards may include IEEE 802.3-2008, Carrier sense Multiple access with Collision Detection (CSMA/CD) Access Method and Physical Layer Specifications, Published in December 2008 (hereinafter "the Ethernet standard"). According to some examples, a network I/O device 110 configured to operate in compliance with the industry standards such the Ethernet standard may include logic and/or features arranged to function as a protocol (e.g., Ethernet) controller for computing device 105. For these examples, although not shown in FIG. 1, network I/O device 110 may be arranged to function as a NIC or LOM and may include a media access controller (MAC), physical (PHY) interface and a direct memory access (DMA) engine or controller.

According to some examples, communication link 135 arranged to couple network I/O device 110 to memory 120 and processor 130 as shown in FIG. 1 may be operated in accordance with various communication protocols. These communication protocols or standards may be described in one or more industry standards (including progenies and variants) to include, but not limited to, the Peripheral Component Interconnect Express (PCI Express) Base 3.0 specification, published in November of 2010 (hereinafter "the PCI Express specification").

In some examples, remote command manager 112 may include logic and/or features configured to operate in accordance with one or more remote management standards or specifications. The one or more remote management specifications may include specifications (including progenies and variants) such as the Intelligent Platform Management Interface Specification (IPMI), Second Generation, version 2.0, revision 1.0, published in February 2004 (hereinafter "the IPMI specification"). For these examples, remote management application 180 may also be configured or arranged to operate in compliance with the IPMI specification.

According to some examples, remote command manager 112 may include logic and/or features configured to operate local management bus 115 in accordance with one or more management bus standards or specifications. The one or more management bus standards may include specifications (including progenies and variants) such as the System Management Bus (SMBus) specification, version 2.0, published in August 2000 (hereinafter "the SMBus specification"). For these examples, remote command manager 112 may be arranged to operate as an SMBus master for local management bus 115.

In some examples, when operating in compliance with the Ethernet standard as well as both the SMBus and IPMI specifications, remote command manager 112 may exchange SMBus messages with remote management application 180. For these examples, the SMBus messages may be encapsulated within an IPMI over LAN Ethernet packet. Upon receipt of the IPMI over LAN Ethernet packet, remote command manager 112 may parse the packet to obtain a target slave address that may correspond to a sensor (e.g., sensor(s) 140) or device (e.g., fan(s) 150) on computing device 105 that remote management application 180 desires to communicate with, manage or control. Remote command manager 112 may then forward the SMBus message to the device or sensor via local management bus 115. If the sensor or device responds to the SMBus message, remote command manager 112 may encapsulate the SMBus response message within another IPMI over LAN Ethernet packet and forward this packet to remote management application 180.

Figure 2:
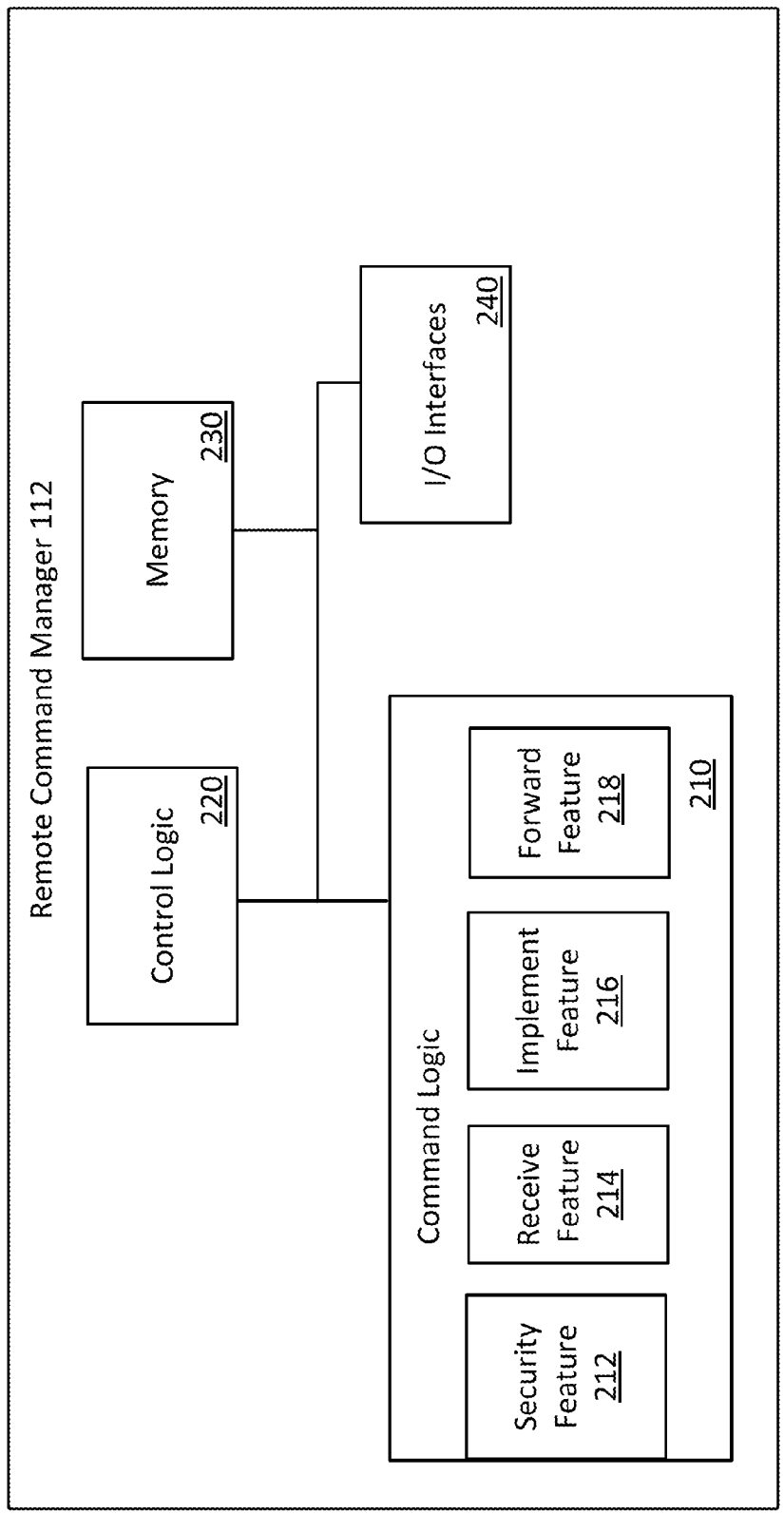
FIG. 2 illustrates a block diagram of an example architecture for a remote command manager.

FIG. 2 illustrates a block diagram of an example architecture for remote command manager 112. In some examples, remote command manager 112 includes features and/or logic configured or arranged for establishing a secure communication link with a remote management application, receiving commands from the remote management application and implementing management functions based on the received commands. According to some examples, as shown in FIG. 2, remote command manager 112 includes a command logic 210, a control logic 220, a memory 230 and input/output (I/O) interfaces 240. As illustrated in FIG. 2, command logic 210 may be coupled to control logic 220, memory 230 and I/O interfaces 240. Command logic 210 may include one or more of a security feature 212, a receive feature 214, an implement feature 216 or a forward feature 218, or any reasonable combination thereof.

In some examples, the elements portrayed in FIG. 2 are configured to support or enable remote command manager 112 as described in this disclosure. A given remote command manager 112 may include some, all or more elements than those depicted in FIG. 2. For example, command logic 210 and control logic 220 may separately or collectively represent a wide variety of logic device(s) or executable content to implement the features of remote command manager 112. Example logic devices may include one or more of a microprocessor, a microcontroller, a processor circuit, a field programmable gate array (FPGA), an application specific integrated circuit (ASIC), a sequestered thread or a core of a multi-core/multi-threaded microprocessor, or a combination thereof.

In some examples, as shown in FIG. 2, command logic 210 includes security feature 212, receive feature 214, implement feature 216 or forward feature 218. In some examples, these features may separately or collectively represent logic, instructions or executable content. Command logic 210 may be configured to use one or more of these features to perform operations. For example, security feature 212 may establish a secure communication link with a remote management application. Receive feature 214 may receive commands from the remote management application via the secure communication link. Implement feature 216 may implement one or more management functions based on the received commands. Forward feature 218 may forward responses associated with the commands from the remote management application. Forward feature 218 may also forward information obtained from sensor(s) and/or device(s) located on a computing device.

In some examples, control logic 220 may be configured to control the overall operation of remote command manager 112. As mentioned above, control logic 220 may represent any of a wide variety of logic device(s) or executable content. For some examples, control logic 220 may be configured to operate in conjunction with executable content or instructions to implement the control of remote command manager 112. In some alternate examples, the features and functionality of control logic 220 may be implemented within command logic 210.

According to some examples, memory 230 may be arranged to store executable content or instructions for use by control logic 220 and/or command logic 210. The executable content or instructions may be used to implement or activate features, elements or logic of remote command manager 112. As described more below, memory 230 may also be arranged to at least temporarily maintain information associated with receiving and/or implementing commands received from a remote management application. Memory 230 may also be arranged to at least temporarily maintain information associated with managing or controlling sensors or devices on a computing device while serving as a proxy for the remote management application. Memory 230 may also be arranged to maintain a profile to provide to a remote management application. The profile may indicate one or more management functions that remote command manager 112 may be capable of implementing at a computing device.

Memory 230 may include a wide variety of non-volatile memory media including, but not limited to, one or more types of flash memory, programmable variables or states, read-only memory (ROM), random access memory (RAM), or other static or dynamic storage media.

In some examples, I/O interfaces 240 may provide an interface via a local communication medium or link between remote command manager 112 and elements of computing device 105. I/O interfaces 240 may include interfaces that operate according to various communication protocols or standards to communicate over the local communication medium or link. These communication protocols or standards may be described in one or more industry standards (including progenies and variants) such as those associated with the Inter-Integrated Circuit (I²C) specification, the SMBus specification, the PCI Express specification, the Universal Serial Bus (USB), specification or the IPMI specification. This disclosure is not limited to only the above-mentioned standards and associated protocols.

According to some examples, I/O interfaces 240 may provide an interface via a network or system management communication medium or link between remote command manager 112 and elements located remote with respect to the computing device that maintains the network I/O device having a remote command manager 112. In some examples, remote with respect to the computing device may include not located in a close proximity in a room, in a structure or even in a geographic area or location. I/O interfaces 240 may include interfaces that operate according to various communication protocols or standards to communicate over the network or system management communication medium or link. These communication protocols or standards may be described in standards or specifications (including progenies and variants) such as the Ethernet standard, the PCI Express specification, the USB specification or the IPMI specification. This disclosure is not limited to only the above-mentioned standards and associated protocols.

Figure 3:
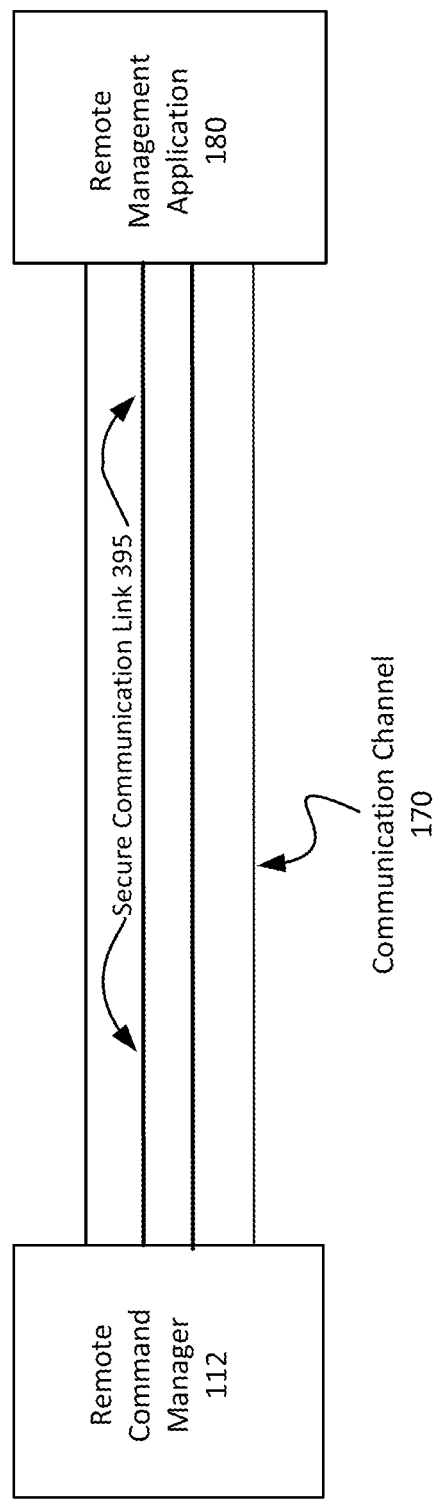
FIG. 3 illustrates a block diagram of a secure communication link.

FIG. 3 illustrates a block diagram of a secure communication link. As shown in FIG. 3, the secure communication link 300 is shown as being established between remote command manager 112 and remote management application 180 over communication channel 170. In some examples, remote command manager 112 includes features and/or logic configured or arranged for establishing secure communication link 300 with remote management application 180 (e.g., security feature 212).

According to some examples, remote management application 180 may be part of a system (e.g., a management server) to remotely manage a large number of computing devices. The large number of computing devices may be configured as a data center such as an Internet Portal Data Center (IPDC). This disclosure is not limited to only data centers such as IPDCs but may apply to any remotely managed computing device. For these examples, establishment of secure communication link 300 may enable remote management application 180 to securely manage computing devices such as computing device 105 over LANs, wide area networks (WANs) or any other suitable wired or wireless communication medium.

In some examples, remote command manager 112 and remote management application 180 may both communicate via communication channel 170 in accordance with the Ethernet standard. Also, remote command manager 112 and remote management application 180 may be configured or arranged to exchange messages in accordance with the IPMI specification. For these examples, secure communication link 300 may be established, but is not limited to, the exchange of Remote Management Command Protocol (RMCP) Ping/Pong messages or via exchange of Remote Authenticated Key-Exchange Protocol (RAKP) messages. Once secure communication link 300 is established, remote management application 180 may send or forward commands to remote command manager 112 via secure communication link 300. Also, remote command manager 112 may send or forward responses to those commands via secure communication link 300.

According to some examples, once secure communication link 300 has been established by exchanging RMCP Ping/Pong messages or RAKP messages, remote management application 180 may also establish a Serial Over LAN (SOL)

connection. Remote management application 180 may utilize the SOL connection with remote manager 112 to provide a mechanism in which data sent to a serial port on computing device 105 may be packaged up in a secure IPMI message and forwarded to remote management application 180. Also, remote management application 180 may be arranged to send back secure IPMI messages to the data source via the SOL connection.

In some examples, remote command manager 112 may provide SOL capabilities by simulating a serial device to elements on computing device 105 such a BIOS implemented on processor 130 (not shown). The BIOS may redirect BIOS information to an emulated serial port for this simulated serial device. For these examples, when remote command manager 112 receives a text packet from the BIOS, remote command manager 112 may take the text packet and package it up to generate an IPMI SOL packet. The IPMI SOL packet may then be forwarded to remote management application 180 via secure communication link 300. If remote management application 180 sends back an IPMI SOL packet, the remote command manager 112 may extract a text packet from this IPMI SOL packet and forward it to the BIOS via the simulated serial device.

Figure 4:
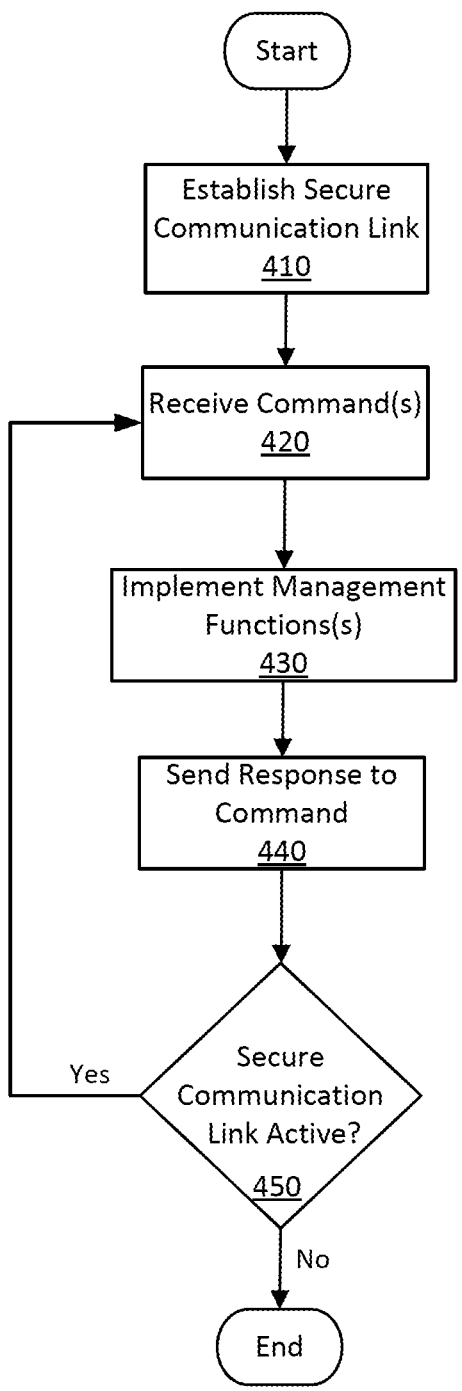
FIG. 4 illustrates an example flow diagram for remote management.

FIG. 4 illustrates an example flow diagram for remote management. In some examples, elements of system 100 as shown in FIGS. 1-3 may be used to illustrate example operations related to the flow chart depicted in FIG. 4. The described example operations are not limited to implementations on system 100 or to elements of system 100 such as network I/O device 110, remote command manager 112 or to remote management application 180 as described above for FIGS. 1-3.

Moving from the start to block 410 (Establish Secure Communication Link), remote command manager 112 at switch 110 may include logic and/or features configured to establish a secure communication link over communication channel 170 (e.g., via security feature 212). In some examples, remote command manager 112 and remote management application 180 may both communicate over communication channel 170 in accordance with the Ethernet standard. Also, remote command manager 112 and remote management application 180 may be configured or arranged to exchange messages in accordance with the IPMI specification. For these examples, a secure communication link 300 may be established via exchanging RMCP Ping/Pong or RAKP messages.

In some examples, once the secure communication link is established, remote command manager 112 may provide a profile to remote management application 180. For these examples, the profile may indicate to remote management application 180 one or more management functions that remote command manager 112 may be capable of implementing at computing device 105. For example, controlling power actions, maintaining a watchdog timer or serving as a proxy device to allow remote management application 180 to communicate with one or more sensors or devices on computing device 105.

Proceeding from block 410 to block 420 (Receive Command(s)), remote command manager 112 may include logic and/or features configured to receive commands from remote management application 180 via a secure communication link (e.g., via receive feature 214). In some examples, the commands may be received via secure communication link 300. For these examples, the commands may include various types of IPMI command messages.

Proceeding from block 420 to block 430 (Implement Management Function(s)), remote command manager 112 may include logic and/or features configured to implement management functions based on the received commands (e.g., via implement feature 216). In some examples, the one or more management functions implemented by remote command manager 112 may enable remote management application 180 to manage or control at least some operating parameters of computing device 105. For these examples, the one or more management functions may be implemented at network I/O device 110 without use of a separate BMC being maintained at or with computing device 105.

Proceeding from block 430 to block 440 (Send Response to Command), remote command manager 112 may include logic and/or features configured to send or forward responses to remote management application 180 (e.g., via forward feature 218). In some examples, responses may include messages to indicate a given command has been implemented. In other examples, the responses may include information requested in a command from remote management application 180 such as temperature measurements from various sensors on computing device 105. In yet other examples, the responses may include IPMI SOL response messages from a BIOS for computing device 105.

Proceeding from block 440 to decision block 450 (Secure Communication Link Active?), remote command manager 112 may include logic and/or features configured to determine whether the established secure communication link is still active (e.g., via security feature 212). In some examples, remote command manager 112 may attempt to send or forward a message and if a response is received from remote management application 180, then the secure communication link may be determined as active and the process moves to block 420. For these examples, if remote management application 180 fails to respond, then the secure communication link may be determined as inactive and the process comes to an end. In some alternative examples, although not shown in FIG. 4, the process may move back to block 420 to establish another secure communication link if the secure communication link is determine to be inactive.

Figure 5:
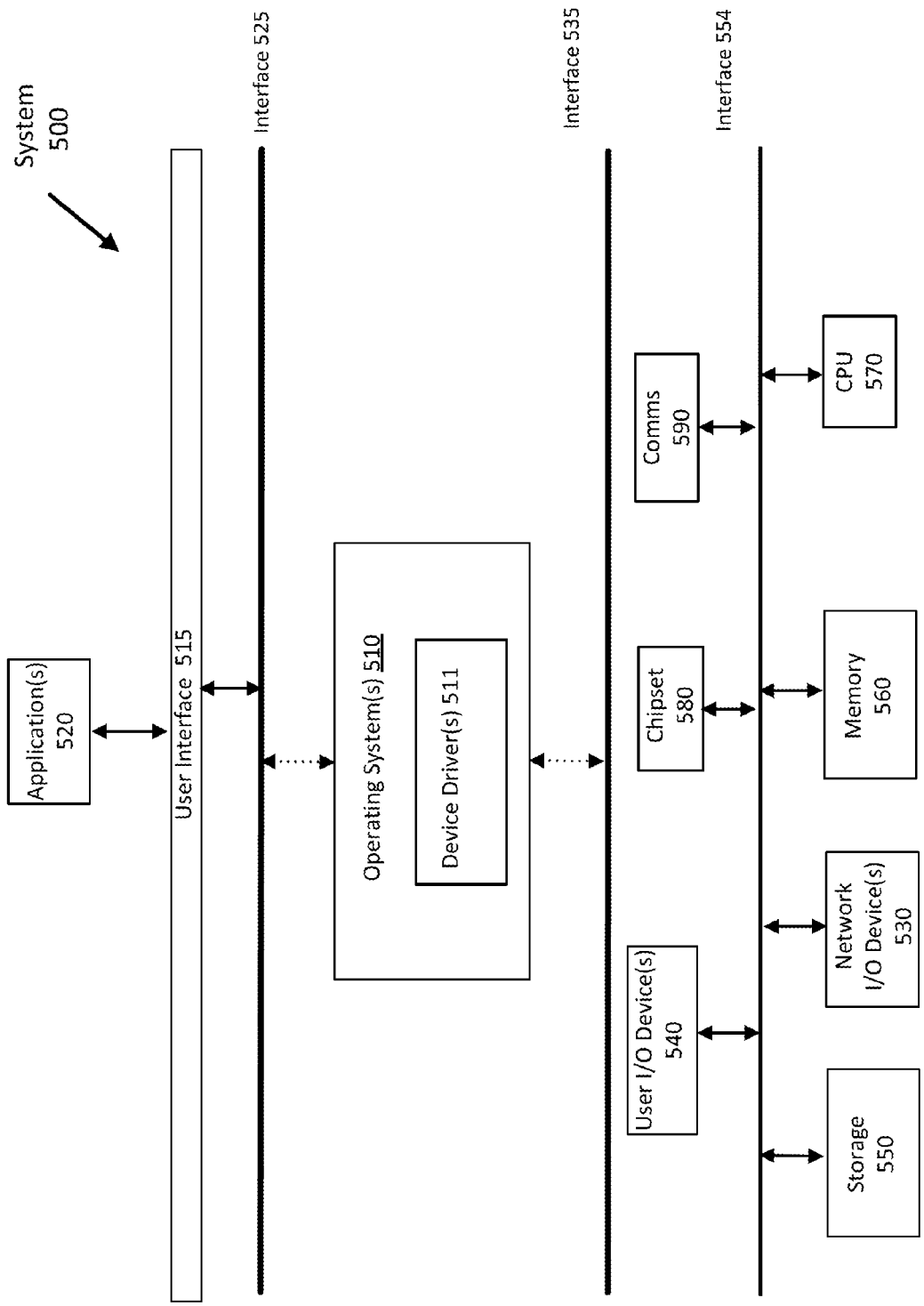
FIG. 5 illustrates a second example system.

FIG. 5 illustrates an example system 500. In some examples, elements of system 500 may be incorporated within computing device 105 as shown in FIG. 1. As shown in FIG. 5, system 500 includes, operating system(s) 510, application(s) 520, network input/output (I/O) device(s) 530, user input/output (I/O) device(s) 540, a storage 550, a memory 560, a central processing unit (CPU) 570, a chipset 580, and communications (Comms) 590. According to some examples, several interfaces are also depicted in FIG. 5 for interconnecting and/or communicatively coupling elements of system 500. For example, user interface 515 and interface 525 may allow for users (not shown) and/or application(s) 520 to couple to operating system(s) 510. Also, interface 535 may allow for elements of operating system(s) 510 (e.g., device driver(s) 511) to communicatively couple to elements of system 500 such as network I/O device(s) 530, user I/O device(s) 540, storage 550, memory 560, CPU 570, chipset 580 or comms 590. Interface 554, for example, may allow hardware and/or firmware elements of system 500 to communicatively couple together, e.g., via a local system management bus or other type of internal communication channel or link.

In some examples, as shown in FIG. 5, system 500 may include operating system(s) 510. Operating system(s) 510, for example, may include one or more operating systems. According to some examples, separate operating systems included in operating systems(s) 510 may be implemented as part of separate virtual machines supported by elements of system 500. For these examples, the separate virtual machines may be associated with one or more processors included in CPU 570.

According to some examples, as shown in FIG. 5, operating system(s) 510 may separately include device driver(s) 511. Device driver(s) 511 may include logic and/or features configured to interact with hardware/firmware type elements of system 500 (e.g., via interface 535). For example, device driver(s) 511 may include device drivers to control or direct storage 550 or memory 560 to fulfill requests made by application(s) 520 or operating system(s) 510. Device driver(s) 511 may also include device drivers to allow network I/O device(s) 530 to interact with CPU 570 and memory 560 to receive/forward data via communication channels coupled to system 500 (e.g., via network I/O device(s) 530 or comm 590).

In some examples, application(s) 520 may include applications that may be implemented on system 500. For these examples, applications(s) 520 may request access (e.g., through operating system(s) 510) or use of elements of system such as user I/O devices 540, storage 550 or memory 560.

According to some examples, network I/O device(s) 530 may be similar to network I/O device 110 described above for FIG. 1. For these examples, network I/O device(s) 530 may include a remote command manager 112 (not shown in FIG. 5) having logic and/or features configured or arranged for establishing a secure communication link with a remote management application, receiving commands from the remote management application and implementing management functions based on the received commands. In some examples, network I/O device(s) 530 may be arranged to function as a NIC or LOM and may include one or more network interface controllers such as an Ethernet controller.

In some examples, user I/O device(s) 540 may include one or more user input devices coupled to interface 554 for entering data and commands to be implemented by elements of system 500. For example, the user input devices may include a keyboard, mouse, touch screen, track pad, track ball, isopoint, a voice recognition system, and/or the like. Similarly, user I/O device(s) 540 may include one or more user output devices coupled to interface 554 for outputting information to an operator or user. For example, the user output devices may include one or more displays, printers, speakers, and/or other output devices, if desired. For example, one of the user output devices may be a display. The display may be a cathode ray tube (CRTs), liquid crystal displays (LCDs), or any other type of display.

In some examples, storage 550 may include various types of memory configured to be implemented or operated in a storage mode of operation. Storage 550 may include at least one or a combination of different types of storage devices to store relatively large amounts of data. These different types of storage devices may include, but are not limited to, one or more of a magnetic disk drive, an optical disk drive, a tape drive, an internal storage device, an attached storage device, flash memory, battery backed-up SDRAM (synchronous DRAM), a network accessible storage device, and/or other types of non-volatile memory (e.g., phase change memory (PCM)). In some examples, storage 550 may be included as part of user I/O devices 730 rather than a separate element as depicted in FIG. 5.

According to some examples, memory 560 may include at least one or a combination of different types of memory to include RAM, DRAM, static RAM (SRAM), phase change material RAM (PRAM), and/or other types of volatile memory.

According to some examples, CPU 570 may be implemented as a central processing unit for system 500. CPU 570 may include one or more processors separately having one or more processor cores. Also, the processors included in CPU 570 may be any type of processor, such as, for example, a multi-core processor, a reduced instruction set computer (RISC), a processor having a pipeline, a complex instruction set computer (CISC), digital signal processor (DSP), and so forth.

In some examples, chipset 580 may provide intercommunication among operating system(s) 510, network user device(s) 530, user I/O device(s) 540, storage 550, memory 560, CPU 570 or comms 590. For example, chipset 580 may provide intercommunication between operating system(s) 510, user I/O device(s) 540, storage 550 and CPU 570 to retrieve information from storage 550 to display graphics on a display included in user I/O device(s) 540. The graphics may have been rendered by CPU 570 at the request of an operating system included in operating system(s) 510.

In some examples, comms 590 may include logic and/or features to enable system 500 to communicate externally with elements remote to system 500. These logic and/or features may include communicating over wired, wireless or optical communication channels or connections via one or more wired, wireless or optical networks. In communicating across such networks, comms 590 may operate in accordance with one or more applicable communication or networking standards in any version. Also, in some examples, comms 590 may be integrated with network I/O device(s) 530 in order to receive/forward data associated with communications to elements remote to system 500 and/or exchange command messages with remote management applications.

As mentioned above, interface 554, may allow hardware and/or firmware elements of system 500 to communicatively couple together. According to some examples, interface 554 may operate in accordance with one or more protocols or standards. These protocols or standards may be described in one or one or more industry standards (including progenies and variants) such as those associated with the I²C specification, SMBus specification, the PCI Express specification, the USB, specification, the IPMI specification, the Accelerated Graphics Port (AGP) specification, the High-Definition Multimedia Interface (HDMI) standard, the Digital Visual Interface (DVI) specification, the Bluetooth™ specification, or the Serial Advanced Technology Attachment (SATA) specification. Although this disclosure is not limited to only the above-mentioned standards and associated protocols.

In some examples, system 500 may be included in a computing device. Examples of a computing device may include, but is not limited to, a server, a blade server, a computing board, a workstation computer, a desktop computer, a personal computer (PC), a laptop computer, or an ultra-mobile computer, and so forth.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   establishing a secure communication link through a network between a network input/output device of a computing device and a remote management application;
   providing a profile to the remote management application, the profile including one or more management functions that the remote management application may implement at the computing device;
   receiving, at the network input/output device, one or more commands from the remote management application via the secure communication link;
   implementing, at a processor circuit incorporated into the network input/output device, one or more management functions based on the received one or more commands, the one or more management functions to enable the remote management application to manage or control one or more operating parameters of the computing device; and
   functioning as a network interface card (NIC) to enable a processor of the computing device coupled to the network input/output device to exchange data with another computing device through the network.

2. The method of claim 1, comprising implementing the one or more management functions at the network input/output device without use of a separate baseboard management controller (BMC).

3. The method of claim 1, the one or more management functions comprising one or more of controlling power actions for the computing device, maintaining a watchdog timer for the computing device or serving as a proxy device to allow the remote management application to communicate with one or more sensors for the computing device.

4. The method of claim 3, the power actions comprising one of power up, power down and reset.

5. The method of claim 1, comprising:
establishing the secure communication link via a communication channel arranged to operate in accordance with an Ethernet standard.

6. The method of claim 5, comprising:
establishing the secure communications link in accordance with an Intelligent Platform Management Interface (IPMI) specification; and
receiving one or more commands formatted in accordance with the IPMI specification from the remote management application.

7. The method of claim 6, the one or more management functions comprising one or more of controlling power actions for the computing device, providing the processor with an emulation of a serial port and establishing a Serial Over Local Area Network (SOL) connection to enable the processor to exchange data with the other computing device through the network via the emulation of a serial port, setting a watchdog timer for the computing device, providing temperature sensor readings of the computing device or serving as a proxy device to allow the remote management application to communicate with one or more sensors for the computing device.

8. The method of claim 7, serving as a proxy device to allow the remote management application to communicate with one or more sensors for the computing device comprises the network I/O device including a local management bus coupled to the one or more sensors for the computing device, the network I/O device arranged to operate the local management bus in accordance with a Smart Management Bus (SMBus) specification.

9. An apparatus comprising:
a processor of a computing device; and
a network input/output device of the computing device, the network input/output device comprising:
   a processor circuit; and
   a memory unit communicatively coupled to the processor circuit, the memory unit arranged to store instructions operative on the processor circuit to:
      establish a secure communication link through a network with a remote management application;
      provide a profile to the remote management application, the profile including one or more management functions that the remote management application may implement at the computing device;
      receive one or more commands from the remote management application via the secure communication link;
      implement one or more management functions based on the received one or more commands, the one or more management functions to enable the remote management application to manage or control one or more operating parameters of the computing device; and
      function as a network interface card (NIC) to enable the processor of the computing device to exchange data with another computing device through the network.

10. The apparatus of claim 9, comprising the memory unit to include volatile memory.

11. The apparatus of claim 9, the control logic to implement the one or more management functions at the network input/output device without use of a separate baseboard management controller (BMC).

12. The apparatus of claim 9, the control logic to implement one or more management functions comprises the logic arranged to implement one or more of controlling power actions for the computing device, maintaining a watchdog timer for the computing device or serving as a proxy device to allow the remote management application to communicate with one or more sensors for the computing device.

13. The apparatus of claim 12, the power actions comprising one of power up, power down and reset.

14. The apparatus of claim 9, the control logic to establish the secure communication link via a communication channel arranged to operate in accordance with an Ethernet standard and the network input/output device capable of being configured to operate as an Ethernet controller for the computing device.

15. The apparatus of claim 14, the computing device arranged to operate as a server and the network input/output device arranged to operate as one of a local access network on motherboard (LOM) or a network interface card.

16. The apparatus of claim 9, the control logic to establish the secure communication link in accordance with an Intelligent Platform Management Interface (IPMI) specification and the one or more commands received from the remote management application to include commands formatted in accordance with the IPMI specification.

17. The apparatus of claim 16, the control logic to implement one or more management functions comprises the logic arranged to implement one or more of controlling power actions for the computing device, providing the processor with an emulation of a serial port and establishing a Serial Over Local Area Network (SOL) connection to enable the processor to exchange data with the other computing device through the network via the emulation of a serial port, maintaining a watchdog timer for the computing device, provide temperature sensor readings of the computing device or serving as a proxy device to allow the remote management application to communicate with one or more sensors for the computing device.

18. The apparatus of claim 17, the control logic to implement serving as a proxy device to allow the remote management application to communicate with one or more sensors for the computing device comprises the network I/O device including a local management bus coupled to the one or more sensors for the computing device, the logic arranged to operate the local management bus in accordance with a Smart Management Bus (SMBus) specification.

19. At least one non-transitory machine readable medium comprising a plurality of instructions that in response to being executed on a system cause the system to:
establish a secure communication link through a network between a network input/output device for a computing device and a remote management application;
receive one or more commands from the remote management application via the secure communication link;
provide a profile to the remote management application, the profile including one or more management functions that the remote management application may implement at the computing device;
implement, at a processor circuit incorporated into the network input/output device, one or more management functions based on the received one or more commands, the one or more management functions to enable the remote management application to manage or control one or more operating parameters of the computing device without use of a separate baseband management controller (BMC); and function as a network interface card (NIC) to enable a processor of the computing device coupled to the network input/output device to exchange data with another computing device through the network.

20. The at least one non-transitory machine readable medium of claim 19, the one or more management functions comprising one or more of controlling power actions for the computing device, maintaining a watchdog timer for the computing device or serving as a proxy device to allow the remote management application to communicate with one or more sensors for the computing device.

21. The at least one non-transitory machine readable medium of claim 20, the secure communication link established via a communication channel arranged to operate in accordance with an Ethernet standard.

22. The at least one non-transitory machine readable medium of claim 21, the secure communication link established in accordance with an Intelligent Platform Management Interface (IPMI) specification and the one or more commands received from the remote management application to include commands formatted in accordance with the IPMI specification.

23. The at least one non-transitory machine readable medium of claim 22, the one or more management functions comprising one or more of controlling power actions for the computing device, providing the processor with an emulation of a serial port and establishing a Serial Over Local Area Network (SOL) connection to enable the processor to exchange data with the other computing device through the network via the emulation of a serial port, a watchdog timer for the computing device, providing temperature sensor readings of the computing device or serving as a proxy device to allow the remote management application to communicate with one or more sensors for the computing device.

* * * * *